Patented Sept. 12, 1922.

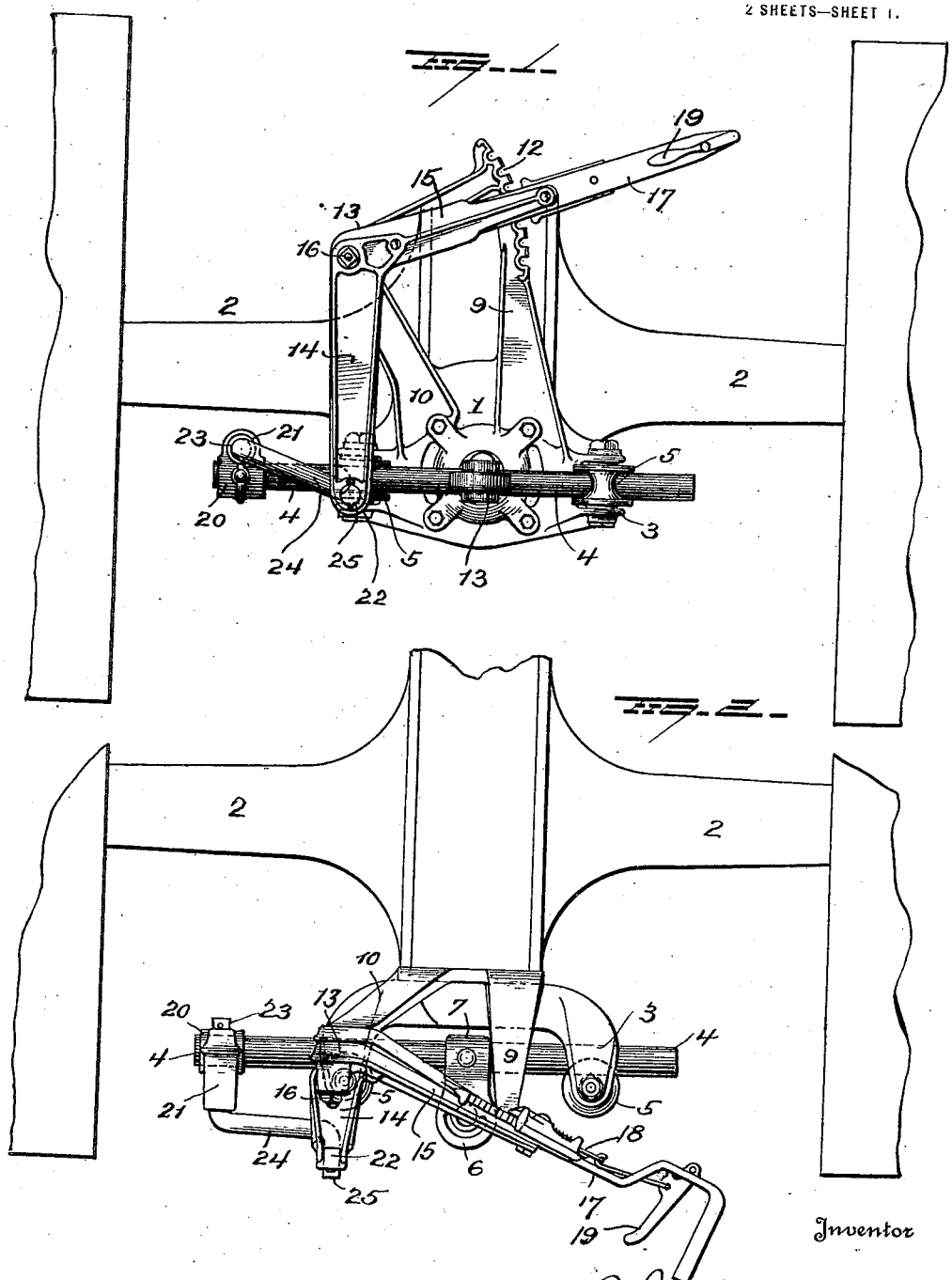

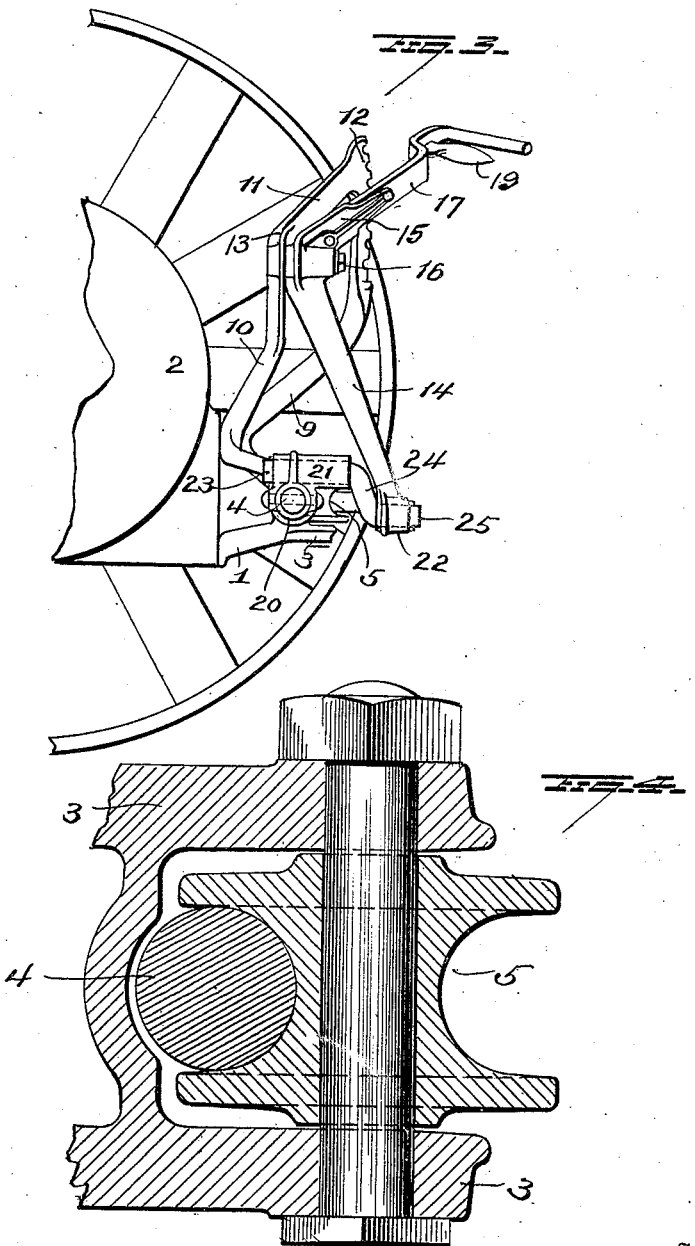

1,428,517

UNITED STATES PATENT OFFICE.

RUDOLPH J. ALTGELT, OF SOUTH BEND, INDIANA, ASSIGNOR TO OLIVER CHILLED PLOW WORKS, OF SOUTH BEND, INDIANA.

HITCH DEVICE.

Application filed May 9, 1921. Serial No. 468,136.

*To all whom it may concern:*

Be it known that I, RUDOLPH J. ALTGELT, a citizen of the United States, and a resident of South Bend, in the county of St. Joseph and State of Indiana, have invented certain new and useful Improvements in Hitch Devices; and I do hereby declare the following to be a full, clear, and exact description of the invention, such as will enable others skilled in the art to which it appertains to make and use the same.

This invention relates to improvements in hitch devices, and more particularly to such as are adapted for use in connecting an agricultural implement,—as a plow, cultivator, harrow or planter,—with a tractor.

One object of my present invention is to provide a simple and efficient hitch device for the purpose stated, which may be easily shifted or adjusted in such manner as to cause an agricultural implement which is connected thereby with a tractor, accurately to follow the tractor on hilly ground,—viz, to permit the hitch between the tractor and implement to be shifted up-hill when said implement tends to slip sidewise down-hill, and thus counteract the tendency of the implement to slip.

A further object is to so construct a shifting-hitch device as to minimize binding tendency and thereby facilitate the free and easy shifting of the movable parts by manually operable means, and to construct the device in such manner as to prevent the same from becoming so clogged with dirt as to interfere with its shifting operations.

With these and other objects in view, the invention consists in certain novel features of construction and combinations of parts as hereinafter set forth and pointed out in the claims.

In the accompanying drawings, Figure 1 is a rear elevation of a hitch device embodying my improvements and showing the same applied to a tractor. Figure 2 is a plan view. Fig. 3 is a side view, and Figure 4 is a detail sectional view showing the hitch bar and one of the rollers against which it bears.

My improved hitch device includes in its structure, a bracket 1 to be securely bolted to the rear end of a tractor, the latter being indicated at 2. The bracket 1 is provided at or near its respective ends with rearwardly projecting bifurcated arms 3 through which a cylindrical hitch bar 4 is movable. This hitch bar is sufficient in length to extend beyond both ends of the bracket 1 and bears against grooved rollers 5 mounted in said bifurcated arms. The groove in each roller 5 is of a depth equal to more than the diameter of the hitch bar so that said rollers will resist vertical strain to which the bar may be subjected when in use and at the same time permit free movement of said bar.

The hitch bar 4 carries (at a position intermediate of its ends) an arm or hitch member 6 to be connected with the forward end of an agricultural implement or to a suitable draw-bar with which said implement may be provided. The hitch arm or member 6 is provided at one end with a cylindrical boss 7 for the accommodation of the cylindrical hitch bar 4 and a pin 8 passes through said boss and hitch bar for rigidly securing the hitch arm to the latter.

The bracket 1 is provided with upwardly projecting, diverging arms 9 and 10, the upper portions of which are connected by an approximately horizontal arm or brace 11 and a portion of the arm 9 is notched to form a toothed segment 12,—said arms 9, 10 and 11 forming, in effect, a segmental frame integral with the bracket 1, and portions of the upright arms 9 and 10 may be bent rearwardly so that the upper part of said frame will be suitably disposed to permit convenient access to manually operable devices mounted on said frame.

A lever 13 having two arms 14 and 15 disposed approximately at right angles to each other, is pivotally mounted at the juncture of its arms on a pin 16 secured to the segment frame at the juncture of its arms 9 and 10, and to the arm 15 of said lever, a hand lever 17 is secured and constitutes, in effect, an extension of said arm 15 of the lever 13. The lever extension 17 carries a spring pressed detent 18 to cooperate with the toothed segment 12 and a finger lever 19 is connected with said detent for withdrawing the latter from the segment.

A collar 20 is rigidly pinned to one end portion of the hitch bar 4 and this collar carries (preferably integral therewith) an elongated sleeve or bearing member 21. The depending arm 14 of the lever 13 is formed with an enlargement which provides an elongated bearing 22. It will be observed that the elongated bearing 21 is disposed at right angles to the axis of the hitch bar 4 and this bearing provides a mounting for a crank arm 23 at one end of a connecting link 24,—the other end of said connecting link having a crank pin 25 mounted in the bearing 22 at the lower end of the lever arm 14.

With the construction and arrangement of parts above described, it will be apparent that when the lever 13 is turned on its fulcrum, the cylindrical hitch bar 4 will be moved longitudinally and the hitch member 6 will be shifted laterally. By providing elongated bearings for the ends of the connecting link 24, any tendency to turn the hitch bar on account of strains to which it may be subjected will be resisted and the ends or cranks of the connecting link will always turn freely in their bearings on the lever 13 and the hitch bar 4 and binding will be effectually prevented.

By making the hitch bar cylindrical in form, clogging of the parts with dirt will be effectually avoided.

Having fully described my invention what I claim as new and desire to secure by Letters-Patent, is:

1. In a hitch device, the combination with a bracket, of a longitudinally movable hitch bar mounted therein, an operating lever pivotally supported on the bracket, an elongated bearing sleeve rigid with said hitch bar and disposed approximately at right angles to the axis thereof, and a connecting link having a crank pin at one end loosely connected with said lever and having a crank arm at its other end mounted in said elongated bearing sleeve.

2. In a hitch device, the combination with a bracket, having bifurcated arms and grooved rollers mounted in said bifurcated arms, of a cylindrical hitch bar passing through said bifurcated arms and adapted to bear against said rollers, a hitch member rigidly secured to an intermediate portion of said hitch bar and projecting rearwardly from the latter, an elongated bearing sleeve rigidly secured to an end portion of the hitch bar and disposed approximately at right angles to the axis of the latter, an operating lever, and a connecting link provided at one end with a crank arm freely mounted in said elongated bearing sleeve, said link being pivotally connected at its other end with said operating lever.

3. In a hitch device, the combination with a bracket provided with a frame having a toothed segment, of a longitudinally movable hitch bar mounted in said bracket, a hitch member rigid with said hitch bar and projecting rearwardly therefrom, a lever pivoted to said frame and having a depending arm, a detent carried by the other arm of said lever to engage the toothed segment, a bearing sleeve rigid with the hitch bar and disposed approximately at right angles thereto, and a connecting link having a crank pin at one end loosely mounted in a bearing at the lower end of the depending arm of said lever, said connecting link having at its other end a crank extension mounted in said bearing sleeve.

In testimony whereof, I have signed this specification in the presence of two subscribing witnesses.

RUDOLPH J. ALTGELT.

Witnesses:
R. B. MARBAUGH,
JENNIE M. DAVIS.